J. W. McDONALD.
Unhairing and Scouring Machines.

No. 220,930.  Patented Oct. 28, 1879.

WITNESSES.
Geo. F. Walker
A. J. Oettinger

INVENTOR.
James W. McDonald.
by his Attys
Clarke & Raymond 2d

UNITED STATES PATENT OFFICE.

JAMES W. McDONALD, OF WOBURN, ASSIGNOR OF ONE-HALF OF HIS RIGHT TO THOS. WM. CLARKE, OF BOSTON, AND F. F. RAYMOND, 2D., OF NEWTON, MASSACHUSETTS.

IMPROVEMENT IN UNHAIRING AND SCOURING MACHINES.

Specification forming part of Letters Patent No. 220,930, dated October 28, 1879; application filed June 7, 1879.

*To all whom it may concern:*

Be it known that I, JAMES W. McDONALD, of Woburn, in the county of Middlesex and Commonwealth of Massachusetts, have invented an Improvement in Unhairing and Scouring Machines, of which the following is a specification.

In feeding skins and hides to unhairing and scouring machines it is necessary to spread the hide or skin upon the feed table or belt as flatly as possible, in order that all folds and wrinkles may be removed before the same is seized by the feed-rollers. It is not always possible, however, to so spread the skin or hide, and even if it is properly prepared it is of such irregular shape and varying thickness that, unless the feed-rolls act to spread as well as feed, it may become wrinkled or folded in its passage. As a consequence, the portion wrinkled or folded is not only not properly unhaired or scoured, but it is liable to interfere with the operation of the unhairing or scouring roll upon the remainder, or to be torn or a hole burned therein in its passage through the machine.

To obviate this defect I employ a lower feed-roll, which is so shaped that, in connection with the upper feed-roll, it automatically spreads the skin or hide, and at the same time requires less care in preparing the skin or hide upon the table or belt for feeding.

Figure 1:
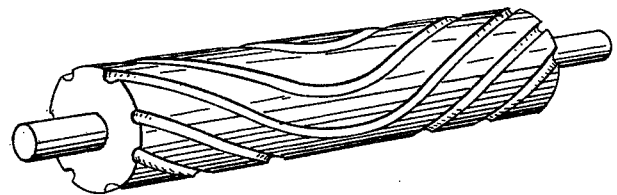
Figure 2:
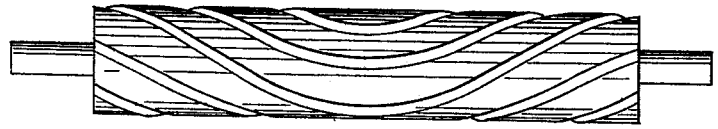
Figure 3:
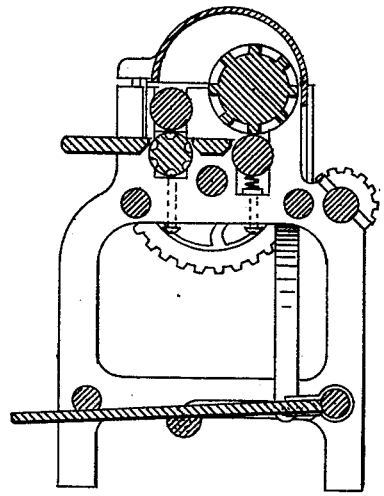

In the drawings, Figure 1 is a perspective of my improved feed-roll. Fig. 2 is an elevation thereof. Fig. 3 is a cross-section of the machine patented to me December 10, 1878, No. 210,797, with the exception of the lower feed-roll, which is like the one shown in Fig. 1.

The feed-roll is provided with right and left spiral grooves. The right spirals on the one side of the center act in opposition to the left spirals on the other side, and their combined action automatically removes wrinkles and folds, and spreads and keeps spread the material presented to them by the opposed spreading action of the conversely-arranged grooves. They are arranged upon the circumference of the roll, and extend from its longitudinal center to the edge.

The feed-roll may be used in place of the feed-roll D' of the machine shown and described in my Letters Patent No. 210,797, granted December 10, 1878, or in lieu of the feed-roll C' shown in the machine granted me February 5, 1878, No. 200,078, or instead of the feed-roll D shown in the machine patented by B. F. Larrabee, July 27, 1877, No. 193,412, or in connection with any other machine, and which it is necessary to automatically spread and keep spread the material which is being passed between a pair of feed-rolls.

Of course, this roll may be provided with all the adjustments which the rolls above mentioned have in relation to the other feed-roll, and in relation to the scouring-roll.

In operation the hide or skin is seized by the two rolls, and the upper roll pressing it upon the lower roll enables the grooves to spread the hide, the portion at the center first laying hold of the hide, and by the continued revolution of the roll cause a separating action upon the stock from its center toward each edge as it is being advanced, the folds or wrinkles being wiped out by the stretching action of the spiral depressions acting in opposition to each other from the center.

Having thus fully described my invention, I claim and desire to secure by Letters Patent of the United States—

In a machine for unhairing and scouring hides and skins, the combination of two feed-rolls, the lower roll being provided with right and left spiral grooves conversely arranged upon its surface, as specified, all arranged to operate substantially as described, and for the purposes set forth.

JAMES W. McDONALD.

Witnesses:
B. E. BOND,
B. T. H. PORTER.